April 25, 1950 R. H. CARTER 2,505,636
ANGULAR ACCELEROMETER
Filed April 10, 1946 2 Sheets-Sheet 1

INVENTOR.
Richard H. Carter
BY
M. B. Tasker
ATTORNEY

April 25, 1950 R. H. CARTER 2,505,636
ANGULAR ACCELEROMETER
Filed April 10, 1946 2 Sheets-Sheet 2

INVENTOR.
Richard H. Carter
BY
M. B. Tasker
ATTORNEY

Patented Apr. 25, 1950

2,505,636

UNITED STATES PATENT OFFICE 2,505,636

ANGULAR ACCELEROMETER

Richard H. Carter, Bridgeport, Conn., assignor to United Aircraft Corporation, East Hartford, Conn., a corporation of Delaware Application April 10, 1946, Serial No. 660,907

6 Claims. (Cl. 264—1)

This invention relates to angular accelerometers.

A direct correlation exists between the amount of angular acceleration in an aircraft and the magnitude of the maneuvering loads, and consequently the determination of angular accelerations in an aircraft during flight, both in pitch and in rolling, is important.

The forces resulting from angular accelerations in an aircraft are, however, very small as compared with forces due to linear accelerations, and in order to measure them the angular accelerometer must be constructed so that it is affected by one component only of angular acceleration and is not affected by linear accelerations caused by aircraft maneuvers or by elastic vibrations of the airplane structure.

Classifying accelerometers have been made which utilize a massive pivoted element which controls electrical contacts and gives a signal when a predetermined value of acceleration is attained. These devices, however, have not been sufficiently sensitive and they cannot give a continuous indication of angular accelerations.

It is an object of this invention to provide an angular accelerometer capable of giving a continuous indication of an existing angular acceleration.

Another object of the invention is to provide an improved device of this general type in which the inertia element has a minimum of weight for its moment of inertia, in which friction producing pivots for the support of the inertia element are eliminated, and in which contacts controlled by the inertia element are avoided.

A further object of the invention is to provide an angular accelerometer having a natural frequency high enough and having provisions for damping such that angular accelerations up to about ten cycles per second can be accurately measured.

A still further object of the invention is to provide true viscous damping for the inertia element in a device of this type.

A further object of the invention is to provide means to insure accuracy in an instrument of this type under conditions of fluctuating temperature encountered in flight.

A yet further object of the invention is to provide an angular accelerometer constructed so as to give the maximum sensitivity to the angular acceleration to be measured while isolating to a maximum degree the other acceleration components and temperature effects to which the instrument is subjected.

These and other objects and advantages of the invention will appear hereinafter or will be evident from the accompanying drawings in which a preferred embodiment of the invention is illustrated.

In these drawings.

Figure 1:
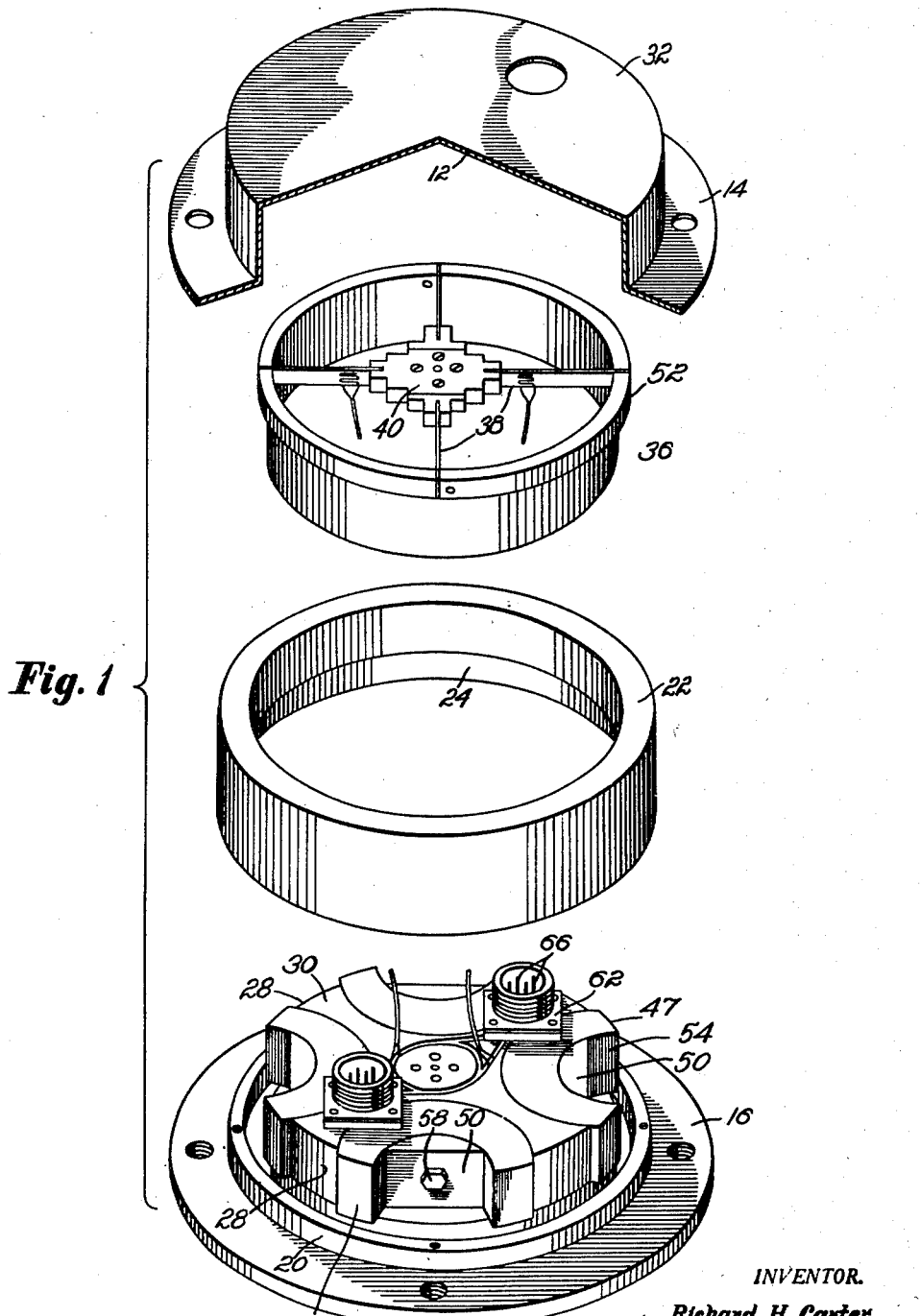
Fig. 1 is an exploded perspective view of an angular accelerometer constructed in accordance with this invention, parts of the cover being broken away to facilitate illustration.

As herein shown, the angular accelerometer includes an annular base generally indicated at 10 which supports an inverted cup-shaped cover 12 for enclosing the instrument mounted on base 10. The cover and base have parallel, peripheral flanges 14 and 16 respectively and the cover is secured removably to the base by screws 18 which pass through flange 14 and are threaded into base flange 16.

The base 10 has an upstanding annular flange 20 adjacent its periphery for positioning a metal ring 22 which is seated on the top of the flange and is provided with a depending annular flange 24 surrounding flange 20. Screws 26 extend through the base flange 20 from beneath and are threaded into ring 22, securing this ring rigidly to the base in concentric relation therewith.

Base 10 also has a central upstanding, integral pedestal 28 which is annular in its outer configuration and has a flat top 30 terminating a substantial distance below the flat top 32 of cover 12 at the same level as the top of ring 22. The outer diameter of pedestal 28 is slightly less than the inside diameter of ring 22, providing a narrow annular space 34 therebetween which extends from the base to the top 30 of pedestal 28.

An inertia ring 36 is disposed in space 34 and is supported for a degree of free rotational movement about its axis on four equally spaced bending beams, or spokes, 38 which radiate from a fixed hub 40 secured to the top 30 of pedestal 28 by four screws 42. Preferably the inner ends of the beams are secured, as by silver soldering, in radial kerfs 44 in brackets 46 which are detachably secured to hub 40 by screws 48. The outer ends of the beams 38 are similarly secured in radially aligned kerfs 50 in the upper thickened rim 52 of ring 36. The beams 38 are thin, flat strips of resilient material having very little stiffness in the longitudinal direction to resist rotational movement about the axis of ring 36 but great stiffness in depth, i. e., in the direction to resist rotational and linear components of forces normal to the plane of the ring 36.

In order that the temperature of the ring 36 and the beams 38 may be maintained uniform, the bending beams 38 and the ring 36 are made of some good heat conducting material. An excellent material for the spokes is sterling silver, as it provides good conductivity with the correct degree of flexibility. The inertia ring 36 besides being constructed of a metal having great weight should be of a material which possesses the combination of a low volume resistivity, a low modulus of elasticity and high thermal conductivity. Pure silver has all these requirements to a high degree and with the beams of sterling silver for supports insures as nearly as possible uniformity of temperature throughout the ring and its supporting beams.

Means are provided for damping the rotational movements of ring 36 about its axis including the ring 22, preferably of soft iron, and four cooperating U-shaped permanent magnets 54 carried by the pedestal 28 at equally spaced points about its periphery. The magnets, which are arcuate in configuration, are disposed in corresponding arcuate recesses formed in the pedestal and symmetrical with the beams 38, i. e., with a magnet 54 beneath each beam with its two pole faces 47 equally spaced from the beam and adjacent the inner face of the inertia ring 36. The magnets are clamped in position by means of bolts 58 which extend through washers 56 having inner arcuate faces conforming to the bight of the magnets 54.

Figure 2:
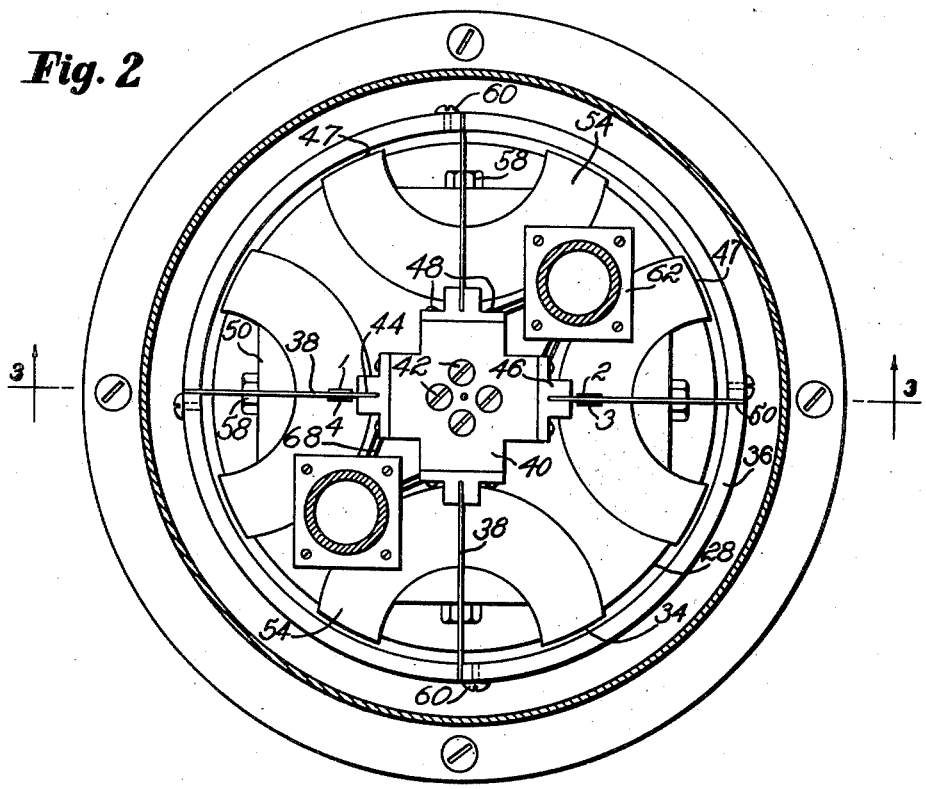
Fig. 2 is a sectional plan view taken on line 2—2 of Fig. 3.

As is most clearly shown in Fig. 2 the ends of the magnets 54 extend beyond the margin of their supporting pedestal 28 into space 34 so that the faces of the magnet poles lie closely spaced from the inner periphery of the soft iron ring 22. The inertia ring 36 lies in this space between the pole faces and ring 22 but out of physical contact with both.

When the inertia ring 36 receives an angular acceleration about its rotational axis the beams 38 bend and the angle through which the ring moves about its axis is a function of the applied acceleration. The value of this angular acceleration can be obtained my measuring either the angular deflection of the ring or the strains produced in beams 38. The latter method is preferred and to this end four strain gauges 1, 2, 3 and 4 are mounted on opposite flat side walls of each of two diametrically opposite beams 38 adjacent the brackets 46, as shown most clearly in Fig. 2.

Provision is made for balancing the spring mass characteristics of the inertia ring so that linear components of acceleration in the plane of the ring will not tend to rotate the ring about its axis. Herein four radially disposed silver screws 60 are provided in the rim of the inertia ring 36 at equally spaced points on the periphery. It will be evident that by adjusting these screws along their axes the ring can be balanced so that linear components of acceleration in the plane of the ring will have no tendency to rotate the ring.

The electrical connections to the strain gauges are made by means of two connectors which have insulating bases 62 mounted on the flat top of the pedestal 28 on opposite sides of the hub 40 and between adjacent beams 38. Each connector has an external screw threaded terminal member 64 enclosing four terminal prongs 66 which are adapted to be received in the four socket terminals of a mating terminal member carried by a flexible cable (shown diagrammatically in Fig. 4), a usual screw threaded clamping ring being provided for engaging the external threads on terminal member 64 to clamp the terminal members of the connector together.

The conductors from the terminal members 64 are contained in channels 68 in the top of pedestal 28, as shown in Fig. 2, from which the conductors extend upwardly to gauges 1, 2, 3 and 4. The four strain gauges 1, 2, 3 and 4 are connected in a Wheatstone bridge arrangement, each gauge constituting one leg of the bridge. It will be noted (Figs. 2 and 4) that gauges 1 and 2 are connected at their corresponding ends to input conductor 70 while gauges 3 and 4 have their corresponding ends connected to input conductor 72 from the oscillator. The other ends of gauges 2, 3 and 1, 4 are similarly connected to output conductors 74 and 76, respectively, which are connected to the amplifier. With this arrangement it will be evident that the bridge output will be proportional to the average bending strains in the beams.

Figure 3:
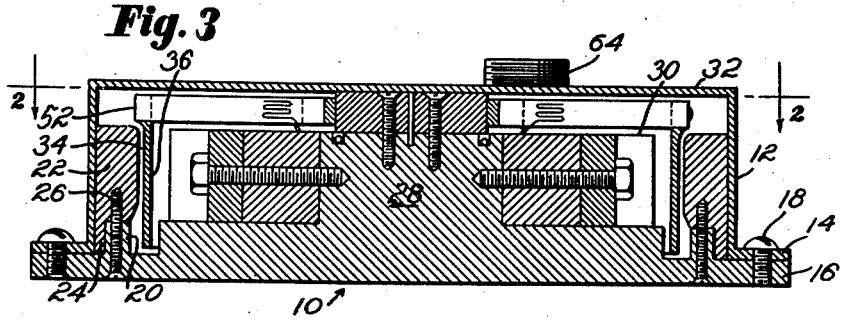
Fig. 3 is a diametrical sectional view taken on line 3—3 of Fig. 2.
Figure 4:
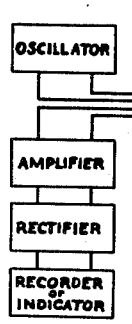
Fig. 4 is a diagrammatic view showing the circuit connections.

In the illustrative embodiment shown in Figs. 1 to 3, two terminal connectors are shown, whereas in the wiring diagram of Fig. 4 only one is shown for reasons of simplification. It will be understood that two terminals are used for the convenience of making electrical connections, and the conductors of these two terminals are connected in parallel.

The operation of the accelerometer in general will be obvious from the above description. However, in order to minimize errors due to axial, or buckling strains, in the beams and since the strain gauges are on two diametrically opposite beams only, it is advisable to locate the accelerometer so that the maximum load factors are in the direction of the beams which do not have gauges. It will be noted that if the gauges are carefully located relative to the axis of rotation of the inertia ring 36, bending of the beams in the direction normal to the plane of ring 36 will produce tension in one half of a gauge and compression in the other half of the same gauge so that the net effect of forces causing such bending is near zero strain.

When the inertia ring as supported on the bending beams is balanced in all vertical positions by adjustment of the screws 60 and the resistances are properly calibrated, it will be evident that the voltages at points 78 and 80 of the bridge (Fig. 4) will be equal and there will be no output from the bridge and no signal on the indicator.

The use of a high thermal conducting material in the inertia ring and its supporting beams reduces the temperature gradient to a minimum, but care should be taken in the use of the instrument to be sure that the temperature variations to which the instrument are subjected are sufficiently slow to give the inertia ring and the beams of the accelerometer time to reach a uniform temperature at the time a reading is taken.

It will be evident that as a result of these improvements an accelerometer has been provided which responds to only one component of angular acceleration, which is not seriously affected by linear accelerations caused by airplane maneuvers, which is insensitive enough to temperature changes so that temperature variations encountered in flight will not cause excessive error; and which has a natural frequency high enough to measure angular accelerations encountered in flight. It will also be evident that the instrument is suitable for flight recording with standard carrier-type oscillographic equipment.

Further, the improved angular accelerometer of this invention is capable of giving a continuous indication of an existing angular acceleration and if desired producing a continuous record; eliminates frictional elements and contact members which have proved undesirable in the past; and provides true viscous damping for the inertia element which is constant in operation under all temperature conditions.

While only one embodiment of the invention has been described and illustrated in detail herein, it will be understood that many changes may be made in the construction and arrangement of the parts without departing from the scope of the invention as defined by the appended claims.

What it is desired to secure by Letters Patent is:

1. An angular accelerometer comprising a support, an inverted cup-shaped member fixed to said support including an annular ring upstanding from said support, a central pedestal fixed to and upstanding from said support within said ring, a plurality of bending beams having their inner ends rigidly supported on said pedestal and having their dimension of greater thickness disposed normal to the plane of said ring, an inertia ring carried by the free ends of said beams having a portion thereof depending within said first mentioned ring, and damping electric magnets carried by said support within the depending portion of said inertia ring having their pole faces adjacent the latter.

2. An angular accelerometer comprising a base having an upstanding fixed central pedestal, a plurality of flat bending beams having their inner ends rigidly supported on said pedestal, said beams having their dimension of greatest thickness vertically disposed, and an inertia ring carried by the free end of said beams and having a depending annular portion, said ring responding to angular movement of said base to distort said bending beams, electrical means for measuring said distortion, radially disposed electric magnets supported on said base within said depending portion of said ring, and an armature ring carried by said base externally of said depending ring portion.

3. An angular accelerometer comprising a support having an upstanding pedestal, a hub nonrotatably secured to said pedestal, a plurality of resilient bending beams having their inner ends rigidly supported on said hub, an inertia ring supported on the outer free ends of said beams, said ring having a depending annular flange extended towards said base, an upstanding armature ring carried by said base and disposed adjacent the outer periphery of said flange, a plurality of electric magnets carried by said support having their pole faces terminating adjacent the inner periphery of said flange, and electric strain gauges carried by the flat side walls of opposed bending beams for measuring the deflection of the latter due to angular components of force affecting said ring.

4. In an instrument for measuring the angular acceleration of a moving body, a base capable of being rigidly mounted on said body and having a central pedestal fixed thereto, a hub nonrotatably secured to said pedestal, a plurality of resilient radially extending bending beams having their inner ends rigidly secured to said hub, an inertia ring supported on the outer free ends of said beams, said ring having a depending annular flange extending toward said base, means for electrically measuring the deflection of said bending beams when said inertia ring is displaced by inertia forces responding to angular movement of said body, and means for damping said inertia ring displacement including a plurality of electric magnets having their pole faces adjacent said depending annular flange.

5. In an instrument as claimed in claim 4 wherein the means for electrically measuring the deflection of the bending beams includes a plurality of strain gauges mounted on said beams, said gauges being interconnected to form a Wheatstone bridge.

6. An angular accelerometer comprising a fixed base capable of being mounted on a body whose angular movement is to be measured, an annular ring upstanding from said base, a central pedestal fixed to and upstanding from said base within said ring, a plurality of bending beams having their inner ends rigidly supported on said pedestal and having their dimension of greater thickness disposed normal to the plane of said ring, an inertia ring carried by the free ends of said beams having a portion thereof depending between said first mentioned ring and said pedestal, and horizontally disposed damping electric magnets carried by said support within said depending portion of said inertia ring having their pole faces adjacent the latter.

RICHARD H. CARTER.

REFERENCES CITED

The following references are of record in the file of this patent:

UNITED STATES PATENTS

| Number | Name | Date |
| --- | --- | --- |
| 982,336 | Wimperis | Jan. 24, 1911 |
| 1,367,690 | Genn | Feb. 8, 1921 |
| 2,129,529 | Howard | Sept. 6, 1938 |
| 2,263,264 | Duwe | Nov. 18, 1941 |
| 2,290,589 | Steinmiller | July 21, 1942 |
| 2,377,212 | Cottrell | May 29, 1945 |
| 2,385,252 | Bennett | Sept. 18, 1945 |
| 2,403,952 | Ruge | July 16, 1946 |